United States Patent
Callahan et al.

(10) Patent No.: US 10,069,289 B2
(45) Date of Patent: Sep. 4, 2018

(54) IN-FLOOR ELECTRICAL FITTING HAVING COVER WITH RECESSED OUTER FLANGE

(71) Applicant: The Wiremold Company, West Hartford, CT (US)

(72) Inventors: Daron Callahan, Plantsville, CT (US); Richard R. Picard, West Hartford, CT (US)

(73) Assignee: The Wiremold Company, West Hartford, CT (US)

( * ) Notice: Subject to any disclaimer, the term of this patent is extended or adjusted under 35 U.S.C. 154(b) by 0 days.

(21) Appl. No.: 15/247,034

(22) Filed: Aug. 25, 2016

(65) Prior Publication Data

US 2017/0063063 A1  Mar. 2, 2017

Related U.S. Application Data

(60) Provisional application No. 62/211,195, filed on Aug. 28, 2015.

(51) Int. Cl.
  *H02G 3/12* (2006.01)
  *H02G 3/18* (2006.01)
  *H02G 3/14* (2006.01)

(52) U.S. Cl.
  CPC .............. *H02G 3/185* (2013.01); *H02G 3/12* (2013.01); *H02G 3/14* (2013.01)

(58) Field of Classification Search
  CPC ............ H02G 3/185; H02G 3/12; H02G 3/08; H05K 5/00

USPC ................. 174/480, 50, 58, 66, 60; 220/3.3
See application file for complete search history.

(56) References Cited

U.S. PATENT DOCUMENTS

| | | | | |
|---|---|---|---|---|
| 3,369,691 A * | 2/1968 | Wei | ......................... | A47J 47/14 206/503 |
| 4,562,602 A * | 1/1986 | Cuschera | .................. | E03C 1/22 285/136.1 |
| 5,160,809 A * | 11/1992 | Yang | ...................... | H02G 3/185 174/481 |
| 5,466,886 A * | 11/1995 | Lengyel | ................. | H02G 3/185 174/487 |
| 5,705,772 A * | 1/1998 | Brown | ................... | H02G 3/185 174/487 |
| 6,114,623 A * | 9/2000 | Bonilla | ................ | H02G 3/0493 174/484 |
| 6,450,353 B1 * | 9/2002 | Riedy | .................... | H02G 3/185 174/485 |
| 7,193,160 B2 * | 3/2007 | Dinh | ...................... | H02G 3/185 174/482 |
| 7,581,655 B1 * | 9/2009 | Trangsrud | .............. | H02G 3/185 174/50 |
| 2003/0109172 A1 * | 6/2003 | Foden | ....................... | E04B 5/48 439/535 |

* cited by examiner

*Primary Examiner* — Dhirubhai R Patel
(74) *Attorney, Agent, or Firm* — McCormick, Paulding & Huber LLP

(57) ABSTRACT

According to the present disclosure, a cover assembly for an in-floor fitting includes an upper ring, a lower ring connectable to a housing configured to accommodate electrical receptacles, and a flange member clamped between the upper ring and the lower ring. The flange member extends radially outward from the upper ring and lower ring and is configured to support the in-floor fitting on a surface.

17 Claims, 8 Drawing Sheets

IN-FLOOR ELECTRICAL FITTING HAVING COVER WITH RECESSED OUTER FLANGE

CROSS-REFERENCE TO RELATED APPLICATIONS

This application claims priority to U.S. Provisional Patent Application No. 62/211,195 filed Aug. 28, 2015, which is hereby incorporated by reference herein in its entirety.

TECHNICAL FIELD

The present disclosure relates to in-floor electrical fittings.

BACKGROUND

Conventional in-floor electrical fittings such as floorboxes and poke-through devices often include a cover with two major pieces: a cover ring and a lid. One such conventional fitting is shown in FIGS. 1A and 1B. FIG. 1A is a front view of a conventional fitting 10 and FIG. 1B is a top view of fitting 10. In fitting 10, the lid 14 of cover 12 is mounted to the cover ring 16 through a hinge 18. The cover ring 16 includes an outer flange 20. Outer flange 20 helps to support the fitting against its own weight, as the hole in the floor through which the fitting passes may be slightly larger in diameter than the fitting such that there is insufficient or no friction between the outer surface of the side of the fitting and the inner surface of the hole in the floor. The outer flange 20 extends radially outward from the top portion of the cover ring 16 such that the top surface of the outer flange 20 is flush with the top surface of the lid 14 when the lid 14 is closed. As such, when the fitting is installed in a floor the entire top surface of the outer flange 20 is visible, which is undesirable. Additionally, because the outer flange 20 is integral to the cover ring 16 and extends outwardly from the cover ring in a cantilever-type fashion, there can be appreciable shear stress at the junction between the outer flange 20 and the rest of the cover ring 16, especially when the outer flange is supporting most or all of the weight of the fitting. One type of an in-floor electrical fitting is shown in U.S. Pat. No. 8,063,317.

SUMMARY

According to the present disclosure, a cover assembly for an in-floor fitting includes an upper ring, a lower ring connectable to a housing configured to accommodate electrical receptacles, and a flange member clamped between the upper ring and the lower ring. The flange member extends radially outward from the upper ring and lower ring and is configured to support the in-floor fitting on a surface.

These and other objects, features and advantages of the present disclosure will become apparent in light of the detailed description of embodiments thereof, as illustrated in the accompanying drawings.

DETAILED DESCRIPTION

Figure 1A:
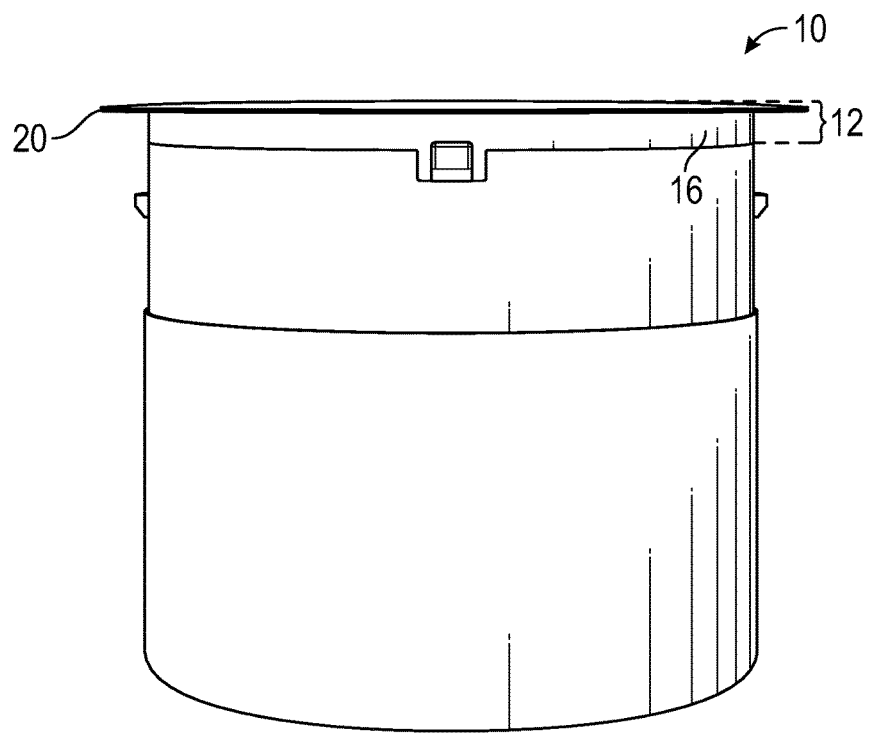
FIG. 1A is a front view of a conventional in-floor fitting.
Figure 1B:
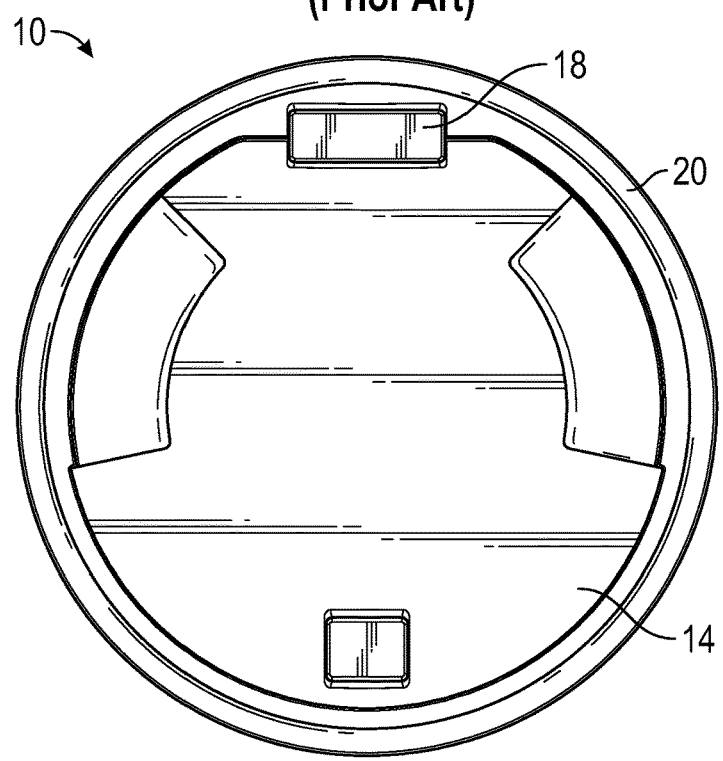
FIG. 1B is a top view of the conventional in-floor fitting of FIG. 1A.

Before the various embodiments are described in further detail, it is to be understood that the invention is not limited to the particular embodiments described. It will be understood by one of ordinary skill in the art that the systems and methods described herein may be adapted and modified as is appropriate for the application being addressed and that the systems and methods described herein may be employed in other suitable applications, and that such other additions and modifications will not depart from the scope thereof.

In the drawings, like reference numerals refer to like features of the systems and methods of the present application. Accordingly, although certain descriptions may refer only to certain Figures and reference numerals, it should be understood that such descriptions might be equally applicable to like reference numerals in other Figures.

Figure 2:
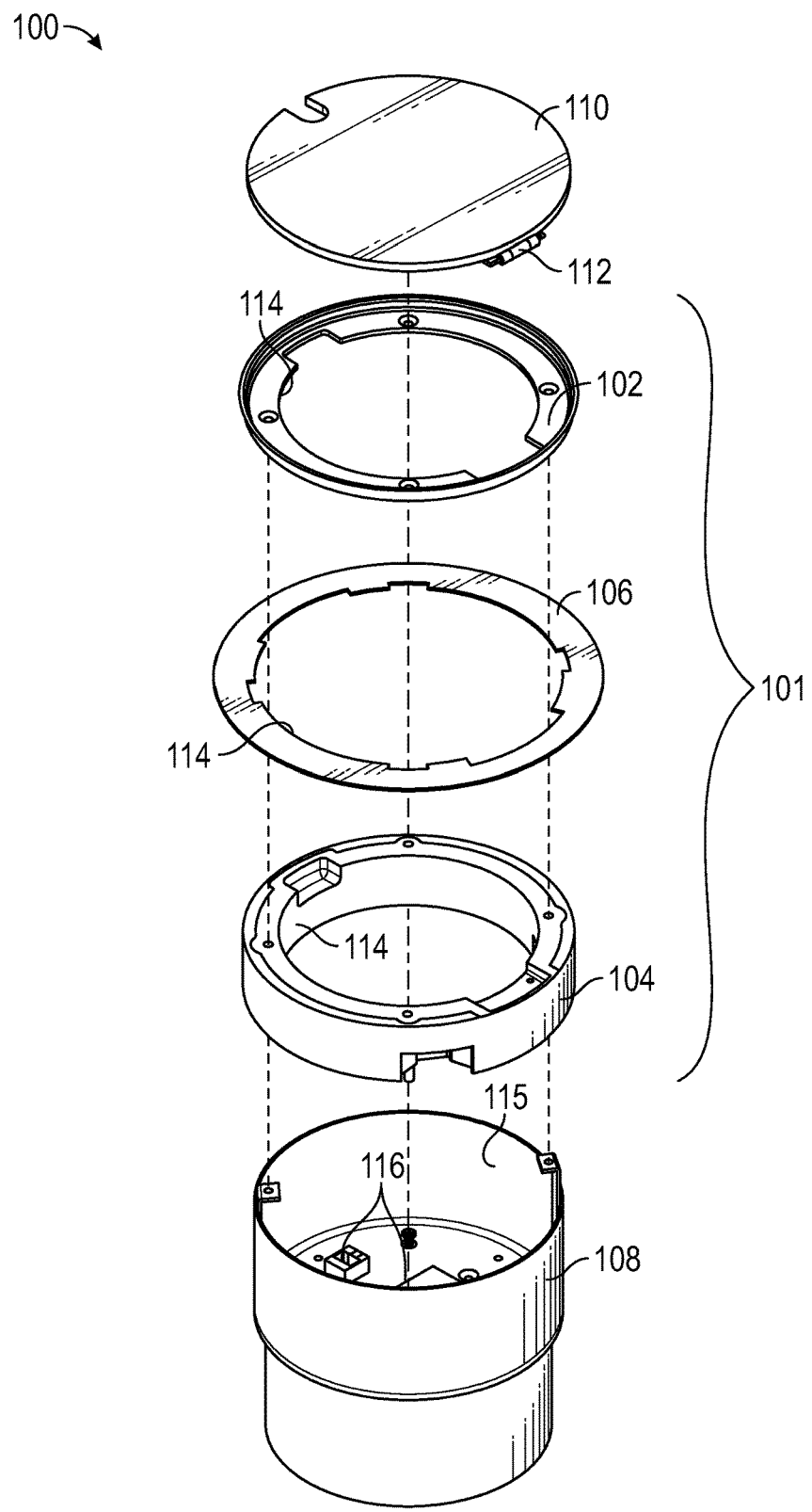
FIG. 2 is an exploded front perspective view of an in-floor fitting according to the present disclosure.

Referring to FIG. 2, an in-floor fitting 100 according to the present disclosure is shown. The in-floor fitting 100 includes an assembly 101 made up of an upper ring 102, a lower ring 104, and a flange member 106 that replaces the cover ring in a conventional in-floor fitting, such as the cover ring 16 shown in FIG. 1A. The in-floor fitting 100 also includes a housing 108, to which the assembly 101 is secured, and a lid 110 connected to the assembly 101 through a hinge connection 112. The assembly 101 may be secured to the housing 108 by screws (not shown) or any other similar fasteners.

The flange member 106 of the assembly 101 is clamped between the upper ring 102 and the lower ring 104. This clamping connection may be made by screws 113, shown in FIGS. 5B and 5C, or the like. For example, the same screws (not shown) that are used to secure the assembly 101 to the housing 108 of the in-floor fitting 100 may also connect upper ring 102 and lower ring 104 together, with flange member 106 clamped in between. Alternatively, a first set of screws, such as screws 113 shown in FIGS. 5B and 5C, may connect upper ring 102 and lower ring 104 together, with flange member 106 clamped in between the upper ring 102 and the lower ring 104, and a second, separate set of screws (not shown) may secure the assembly 101 to the housing 108. This second set of screws (not shown) may, in addition to securing the assembly 101 to the housing 108, supplement the first set of screws by providing additional clamping between the upper ring 102 and the lower ring 104. Additionally, it should be understood that upper ring 102 and lower ring 104 need not be connected using screws and that various other types of connections could be employed. For example, the upper ring 102 and lower ring 104 may be welded together, riveted together or secured together with other types of fasteners or through other types of joining techniques without departing from the teachings of the present disclosure.

The upper ring 102, lower ring 104, and flange member 106 all have central openings 114 that, together, provide access to an interior 115 of the housing 108 through the hingedly attached cover 110 when the assembly 101 is secured to the housing 108. The interior 115 of the housing 108 may accommodate various electrical, data and/or communications connection points 116, such as phone and/or video jacks, USB ports, electrical outlets, or any other similar terminal that provides a connection to an electrical, data and/or communications network.

Figure 3:
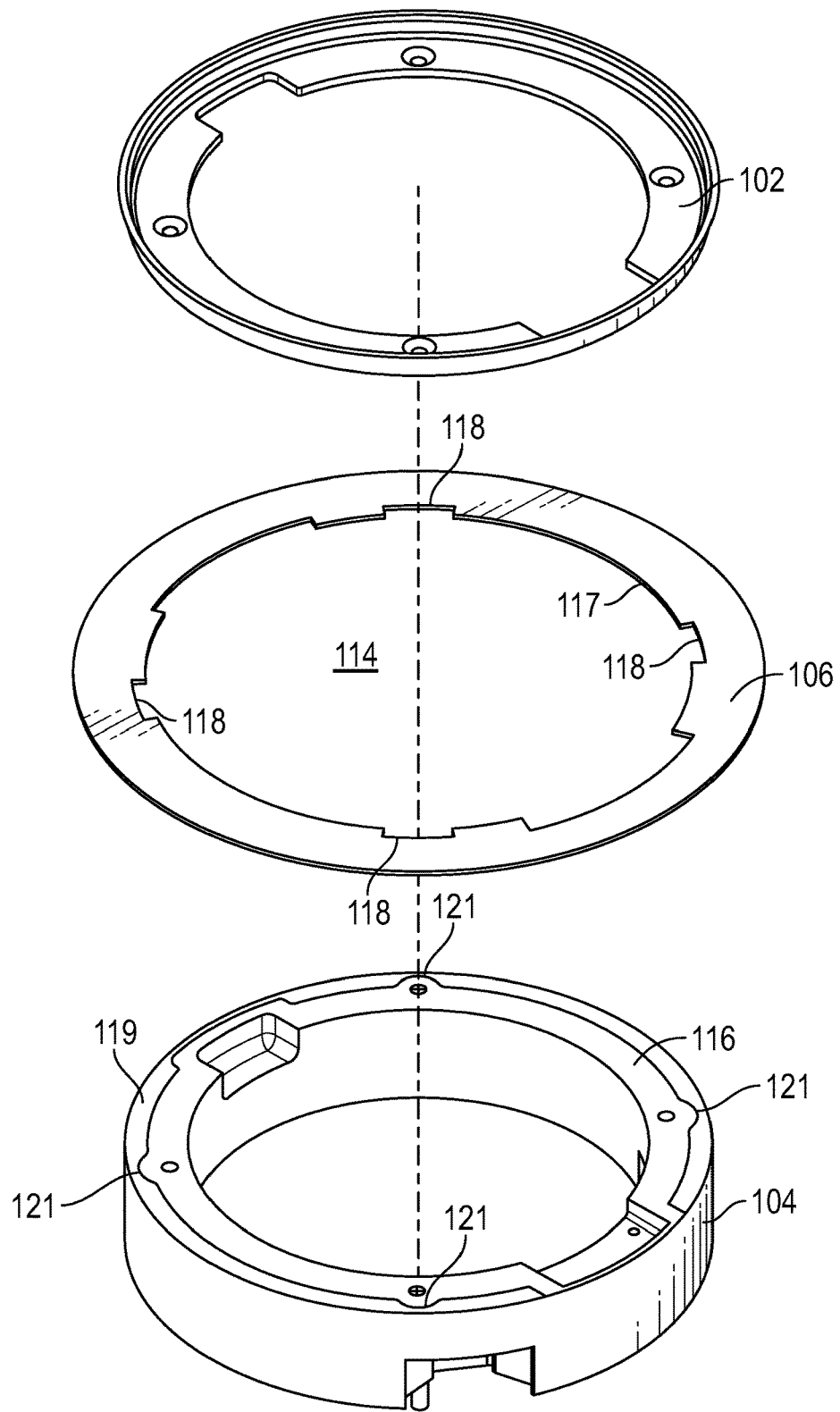
FIG. 3 is an enlarged exploded front perspective view of a portion of the in-floor fitting of FIG. 2.
Figure 4A:
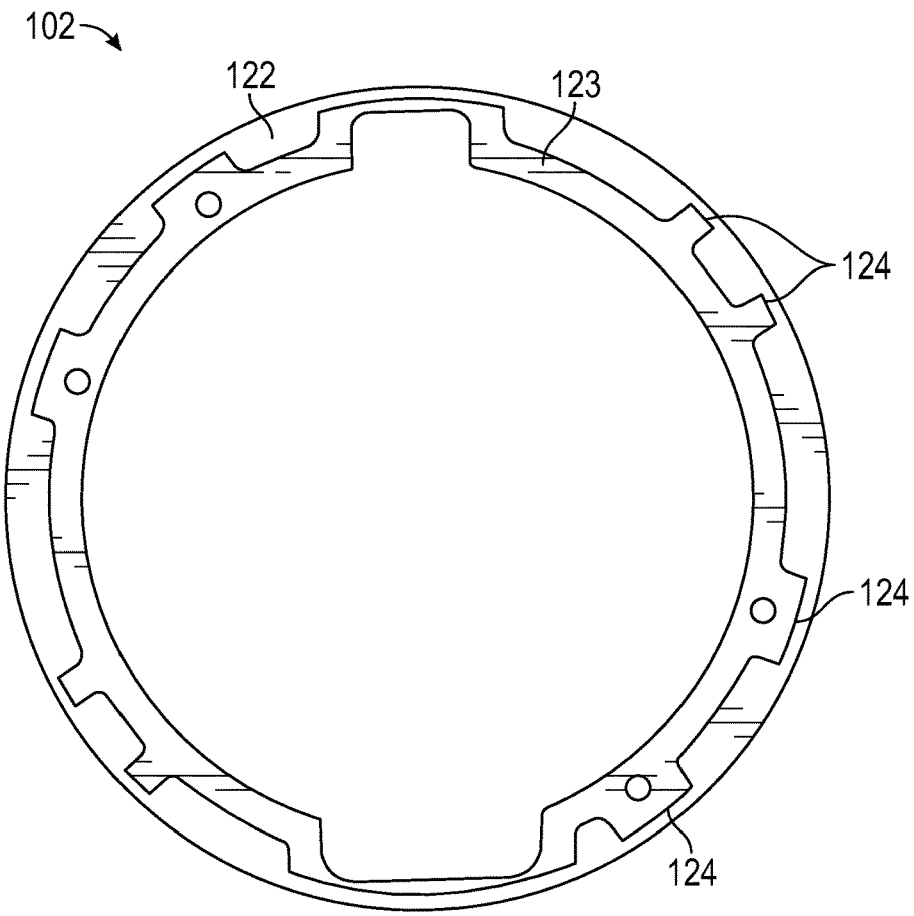
FIG. 4A is an enlarged bottom view of an upper ring of the in-floor fitting of FIG. 2.
Figure 4B:
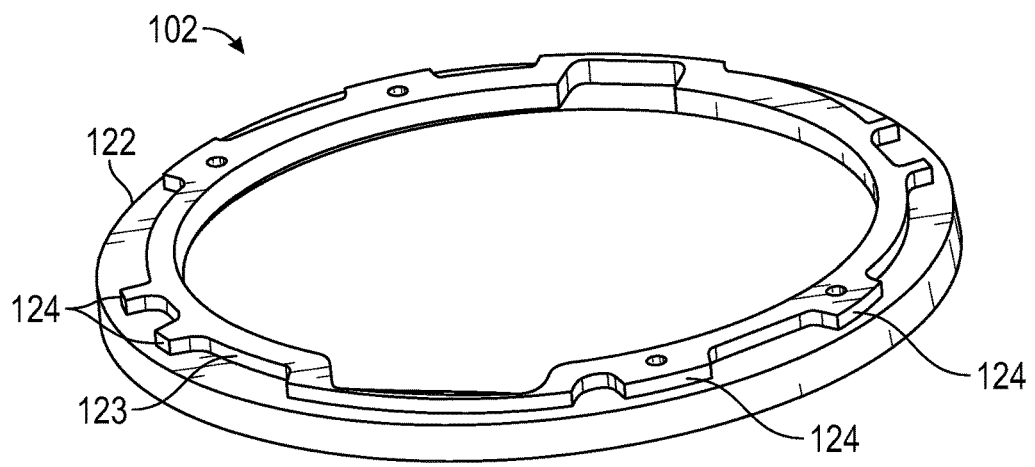
FIG. 4B is an enlarged bottom perspective view of the upper ring of FIG. 4A.

Referring to FIG. 3, an enlarged perspective view of the assembly 101 including upper ring 102, lower ring 104, and flange member 106 is shown. As seen in FIG. 3, an inner edge 117 of flange member 106 defining the central opening 114 in the flange member 106 includes multiple spaced grooves or cutouts 118. A top surface 119 of lower ring 104 has a thin raised surface 120 that includes radial projections 121. Similarly, as seen in FIGS. 4A and 4B, a bottom surface 122 of upper ring 102 may have a thin raised surface 123 with the same or similar projections 124. When the upper ring 102, the flange member 106, and the lower ring 104 are connected together, each projection 121 in lower ring 104 and/or a corresponding projection 124 in upper ring 102 fit within each of the grooves or cutouts 118 in the flange member 106. This may be seen, for example, in the cross-sectional views of FIGS. 5B and 5C, where the thin raised surface 120 of the lower ring 104 is in direct contact with the thin raised surface 123 of the upper ring 124 in the vicinity of the screws 113 clamping the flange member 106 between the upper ring 102 and the lower ring 104. Since these projections 121 and/or 124 are accommodated within the grooves or cutouts 118, the projections 121 and/or 124 cooperate with the grooves or cutouts 118 to keep the flange member 106 rotationally fixed while it is clamped between the upper ring 102 and the lower ring 104.

Figure 5A:
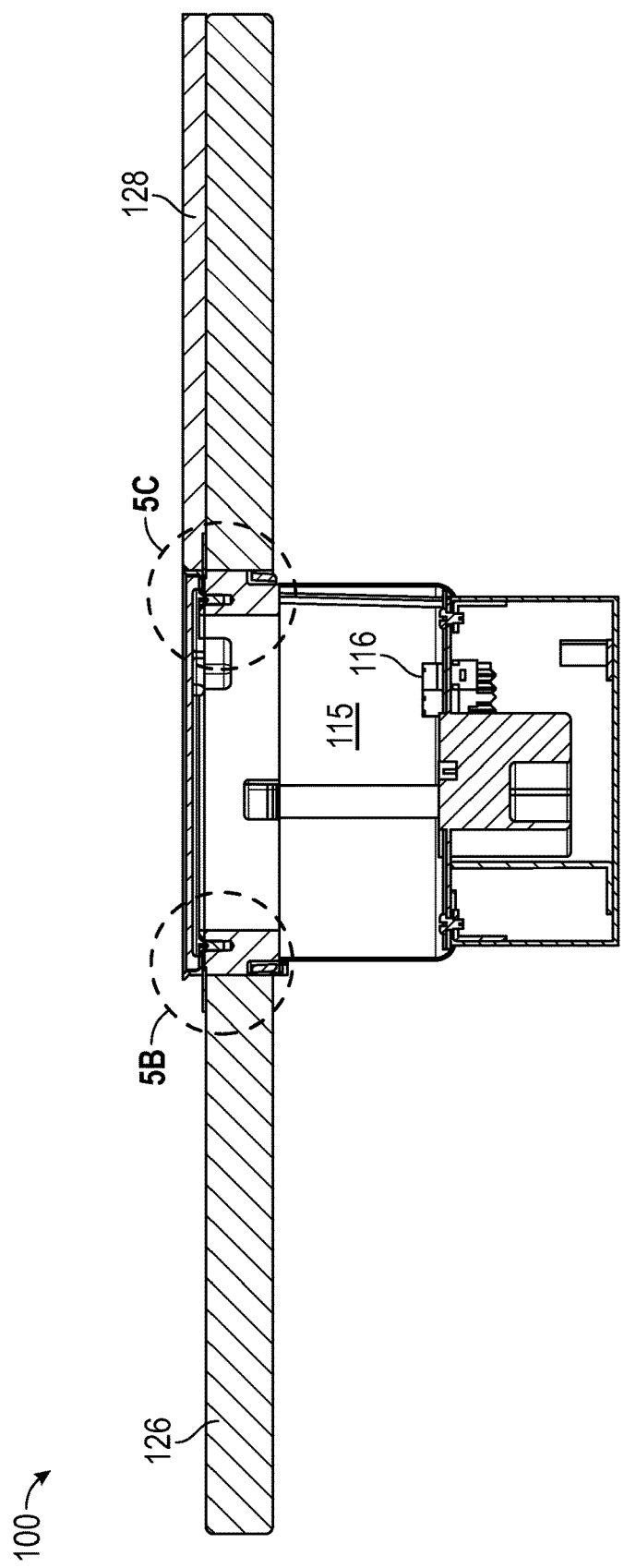
FIG. 5A is a front cross-sectional view of the in-floor fitting of FIG. 2 as installed in a floor.
Figure 5B:
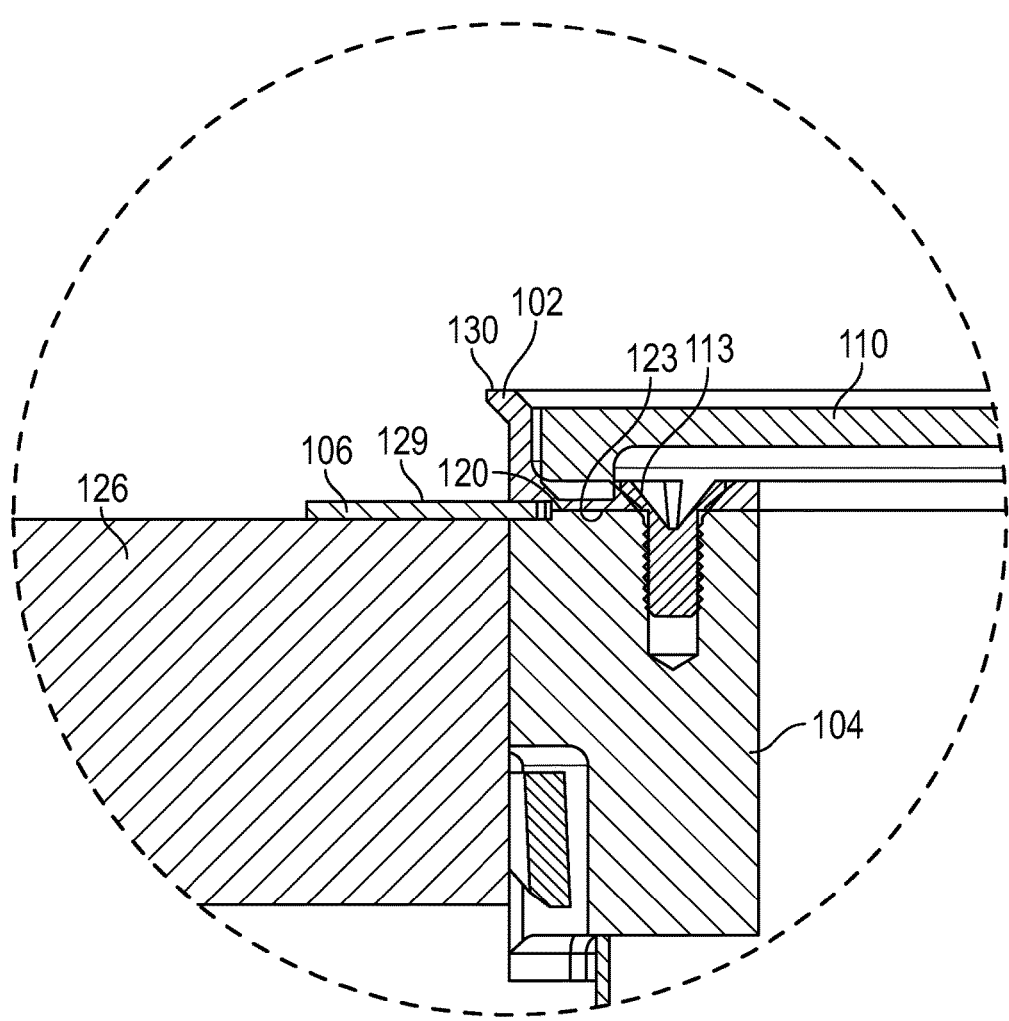
FIG. 5B is an enlarged view of a portion of FIG. 5A.
Figure 5C:
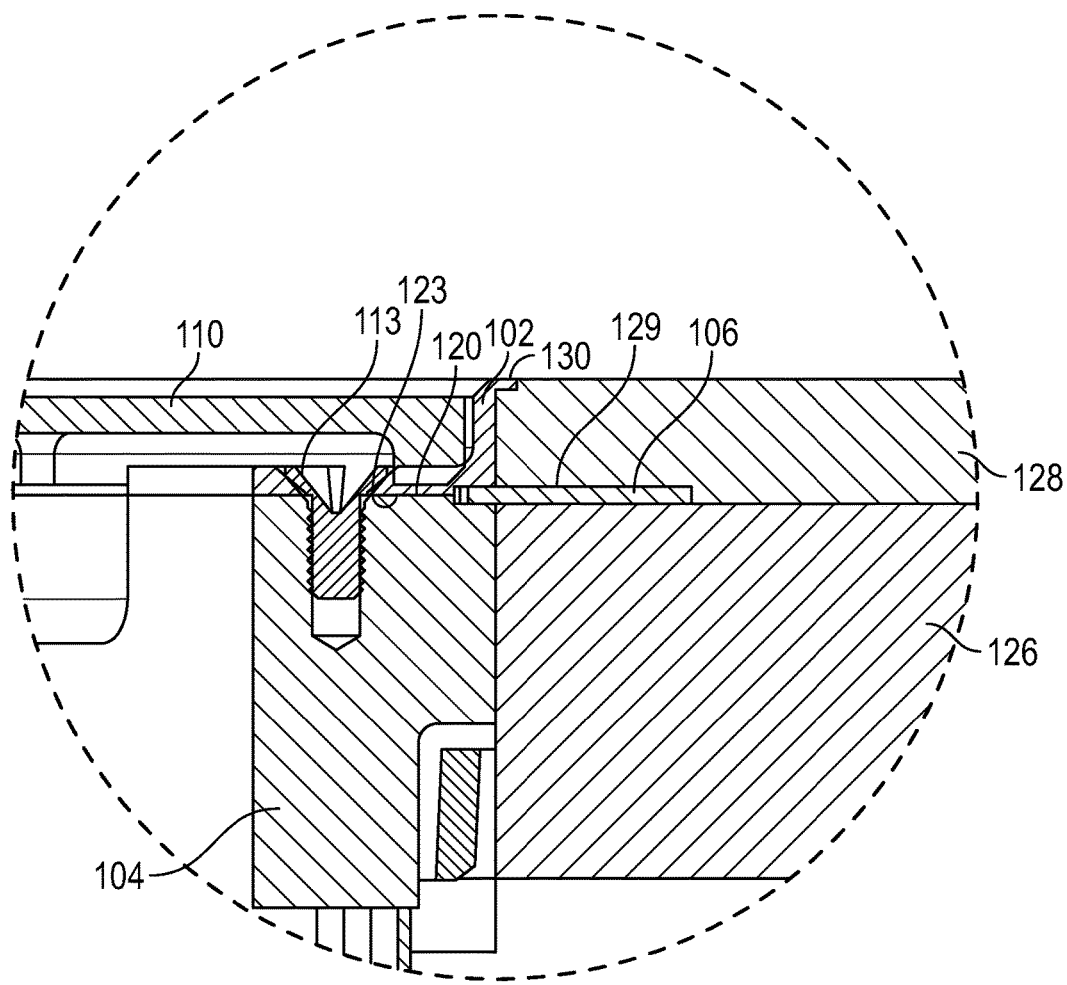
FIG. 5C is an enlarged view of a portion of FIG. 5A.

Referring to FIG. 5A, the in-floor fitting 100 is shown in a cross-sectional view as installed in a floor 126. FIGS. 5B and 5C are enlarged views of indicated regions in FIG. 5A. On one side of the in-floor fitting 100, the side in region 5C, a floor covering such as carpet 128 is shown covering the floor 126 all the way up to the in-floor fitting 100. On the other side of the in-floor fitting 100, the side in region 5B, the floor 126 is shown without any floor covering such as carpet 128. As can be seen in FIGS. 5A-5C, since the flange member 106 has a larger outer diameter than either the upper ring 102 or the lower ring 104, the flange member 106 extends outward to a greater distance than the upper ring 102 and the lower ring 104. This allows the floor covering, such as carpet 128, to be installed over the top of the flange member 106 and to extend right up to the side of upper ring 102, which significantly reduces the top view profile of the in-floor fitting 100 as compared to the conventional fitting 10, shown in FIG. 1A.

Thus, as compared to the single component cover ring 12 in the fitting 10 shown in FIG. 1A, the multi-component assembly 101 of the in-floor fitting 100 of the present disclosure advantageously provides an outer flange of flange member 106 that can be conveniently positioned so that its top surface 129 is recessed from the top surface 130 of the upper ring 102 and, thus, the lid 110. As such, when the fitting 100 is installed in the floor 126, a floor covering, such as carpet 128, may cover the exposed top surface 129 of the flange member 106 so that the top-view profile of the fitting 100 is smaller than for conventional fittings.

Additionally, flange member 106 does not experience the appreciable shear stress that can be experienced at the junction between the outer flange 20, shown in FIG. 1A, and the body of the cover ring 12, shown in FIG. 1A, because, unlike outer flange 20, shown in FIG. 1A, the flange member 106 is not an integral cantilever-like extension of the cover ring. Thus, while there may be some shear stress at the portion of the flange member 106 that is just radially outside the upper ring 102 and the lower ring 104, the stress is lower due to the clamped connection.

Since the flange member 106 of the in-floor fitting 100 is a separate component from the upper ring 102 and the lower ring 104, the flange member 106 may also advantageously be made from a different material than that used for the upper ring 102 and/or the lower ring 104. Additionally, even if all of three members are constructed of steel, flange member 106 could, for example, be constructed of a stronger steel formulation than upper ring 102 and/or lower ring 104.

Figure 6:
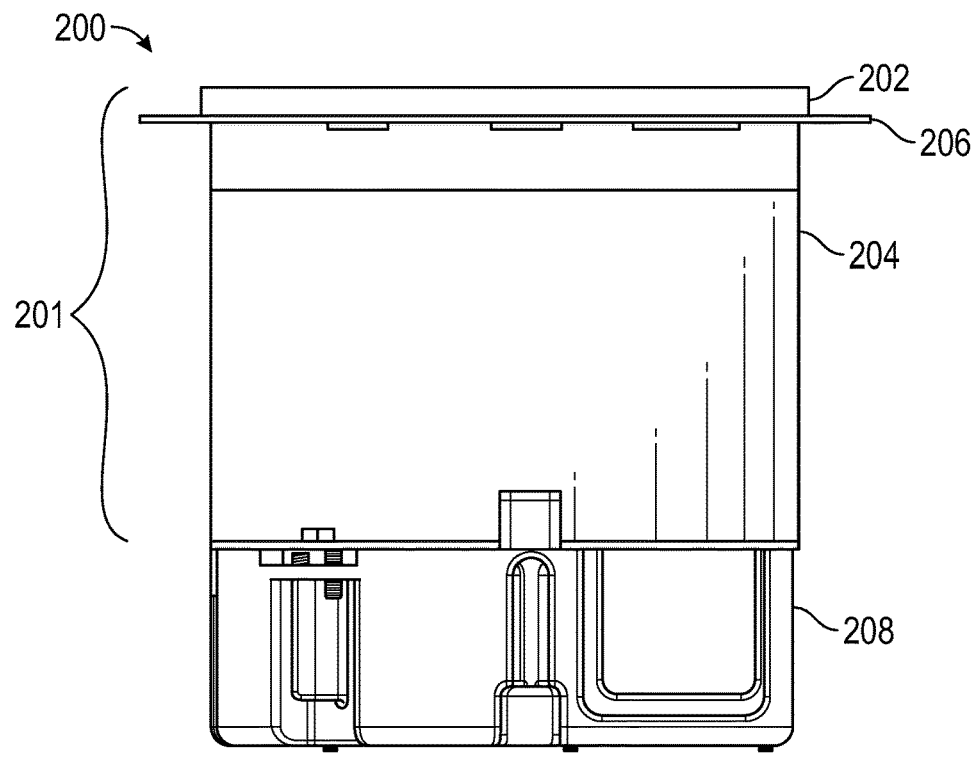
FIG. 6 is a front view of the in-floor fitting according to the present disclosure with an alternate lower ring.

Referring to FIG. 6, another in-floor fitting 200 according to the present disclosure is shown. The in-floor fitting 200 has an assembly 201 with a taller lower ring 204 than the lower ring 104 of the in-floor fitting 100, shown in FIG. 2, but is otherwise the same as the in-floor fitting 100. For example, the taller lower ring 204, together with the upper ring 202, clamps the flange member 206 in the same manner discussed above in connection with the assembly 101, shown in FIG. 2. The taller lower ring 204 advantageously makes the interior of the in-floor fitting 200 deeper to provide more space for wiring and the like within the in-floor fitting 200. The taller lower ring 204 allows the in-floor fitting 200 to be used in applications where greater spacing between the housing 208 and the upper surface of the floor 126, shown in FIG. 5A, is necessary by increasing the spacing between the housing 208 and the flange member 206 that supports the in-floor fitting 200 on the upper surface of the floor 126, shown in FIG. 5A.

Figure 7:
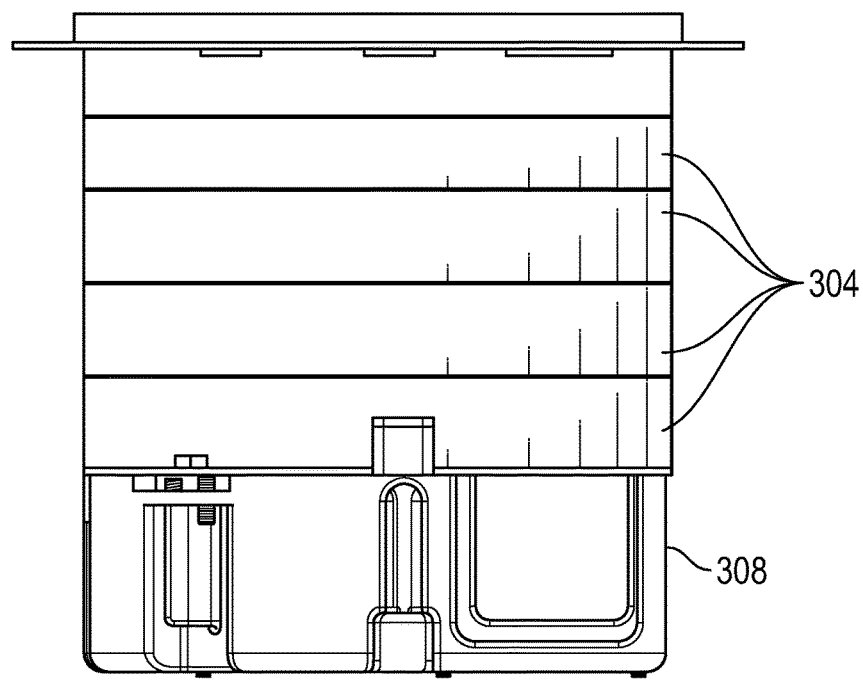
FIG. 7 is a front view of the in-floor fitting according to the present disclosure with stackable lower rings.

Referring to FIG. 7, another in-floor fitting 300 according to the present disclosure is shown. The in-floor fitting 300 has an assembly 301 with a plurality of stackable lower rings 304 in place of the singe lower ring 104, shown in FIG. 2, or lower ring 204, shown in FIG. 6, but is otherwise the same as the in-floor fittings 100 and 200. For example, the uppermost stackable ring 304, together with the upper ring 302, clamps the flange member 306 in the same manner discussed above in connection with the assembly 101, shown in FIG. 2. The plurality of stackable lower rings 304 allow the spacing between the housing 308 and the upper surface of the floor 126, shown in FIG. 5A, to be adjusted as necessary by adding or removing rings 304 from the in-floor fitting 300. For example, four stackable lower rings 304 are shown in FIG. 7. Each of these stackable lower rings 304 may be similar to the lower ring 104 shown in FIG. 2. The stackable rings 304 may be secured to one another and to the housing 308 by screws (not shown) or any other similar type of connection such as welding, rivets or the like. The plurality of stackable lower rings 304 may advantageously be used to make the interior of the in-floor fitting 200 deeper to provide more space for wiring and the like and allows the in-floor fitting 200 to be used in applications where greater spacing between the housing 208 and the upper surface of the floor 126, shown in FIG. 5A, is necessary, or, alternatively, to make the interior of the in-floor fitting 200 smaller in applications where there is less spacing between the housing 208 and the upper surface of the floor 126, shown in FIG. 5A.

As will be recognized by those of ordinary skill in the pertinent art, numerous changes and modifications may be made to the above-described disclosure without departing from the spirit of the invention as defined in the appended claims. Accordingly, the particular embodiments described in this specification are to be taken as merely illustrative and not limiting.

What is claimed is:

1. An in-floor fitting comprising:
   a housing; and
   an assembly secured to an upper end of the housing, the assembly including a flange member clamped between an upper ring and a lower ring, the flange member extending radially outward from the upper ring and lower ring and configured to support the housing and the assembly on a surface of a floor;
   wherein the flange member includes a central opening and an edge of the central opening includes at least one cutout; and
   wherein at least one of a bottom surface of the upper ring or a top surface of the lower ring includes a thin raised surface having at least one radial projection that fits within the at least one cut-out in the flange member.

2. The in-floor fitting according to claim 1, wherein both the bottom surface of the upper ring and the top surface of the lower ring include the thin raised surface having at least one radial projection that fits within the at least one cut-out in the flange member.

3. The in-floor fitting according to claim 1, wherein the upper ring, lower ring, and flange member all have central openings that, together, provide access to an interior of the housing.

4. The in-floor fitting according to claim 3, additionally comprising a cover for the central opening, the cover being hingedly attached to the assembly and movable between a closed position and an open position.

5. The in-floor fitting according to claim 4, wherein the cover is accommodated within an outer wall of the upper ring when in the closed position.

6. The in-floor fitting according to claim 1, additionally comprising at least one additional lower ring stackable between the lower ring and the housing.

7. A cover ring for an in-floor fitting, the cover ring comprising:
   an upper ring;
   a lower ring connectable to a housing configured to accommodate electrical receptacles; and
   a flange member clamped between the upper ring and the lower ring and extending radially outward from the upper ring and lower ring, the flange member configured to support the in-floor fitting on a surface of a floor;
   wherein the flange member includes a central opening and an edge of the central opening includes at least one cutout; and
   wherein at least one of a bottom surface of the upper ring or a top surface of the lower ring includes a thin raised surface having at least one radial projection that fits within the at least one cut-out in the flange member.

8. The cover ring according to claim 7, wherein both the bottom surface of the upper ring and the top surface of the lower ring include the thin raised surface having at least one radial projection that fits within the at least one cut-out in the flange member.

9. The cover ring according to claim 7, wherein the upper ring, lower ring, and flange member all have central openings that, together, provide access to an interior of the in-floor fitting.

10. The cover ring according to claim 9, additionally comprising a cover for the central opening, the cover being hingedly attached to one of the upper ring, lower ring, or flange member and movable between a closed position and an open position.

11. The cover ring according to claim 10, wherein the cover is accommodated within an outer wall of the upper ring when in the closed position.

12. The cover ring according to claim 7, additionally comprising at least one additional lower ring stackable with the first lower ring.

13. A cover assembly for supporting an in-floor fitting, the cover assembly comprising:
    an upper ring having a cylindrical outer wall;
    a cover movable between a closed position and an open position, the cover being accommodated within the outer wall of the upper ring when in the closed position;
    a lower ring connectable to a housing configured to accommodate electrical receptacles; and
    a flange member clamped between the upper ring and the lower ring, the flange member extending radially outward from a bottom of the cylindrical wall of the upper ring and having a top surface recessed below a top surface of the cylindrical wall.

14. The cover assembly according to claim 13, additionally comprising at least one additional lower ring stackable with the first lower ring.

15. The cover assembly according to claim 13, wherein the flange member includes a central opening and an edge of the central opening includes at least one cutout.

16. The cover assembly according to claim 15, wherein at least one of a bottom surface of the upper ring or a top surface of the lower ring includes a thin raised surface having at least one radial projection that fits within the at least one cut-out in the flange member.

17. A cover assembly for supporting an in-floor fitting, the cover assembly comprising:
    an upper ring having a cylindrical outer wall;
    a cover movable between a closed position and an open position, the cover being accommodated within the outer wall of the upper ring when in the closed position;
    a lower ring connectable to a housing configured to accommodate electrical receptacles; and
    a flange member;
    wherein the flange member is positioned between the upper ring and the lower ring and at least one fastener secures the upper ring to the lower ring to clamp the flange member between the upper ring and the lower ring; and
    wherein the flange member extends radially outward from the lower ring and a bottom of the cylindrical wall of the upper ring, the flange member configured to support the in-floor fitting on a surface of a floor.

* * * * *